UNITED STATES PATENT OFFICE.

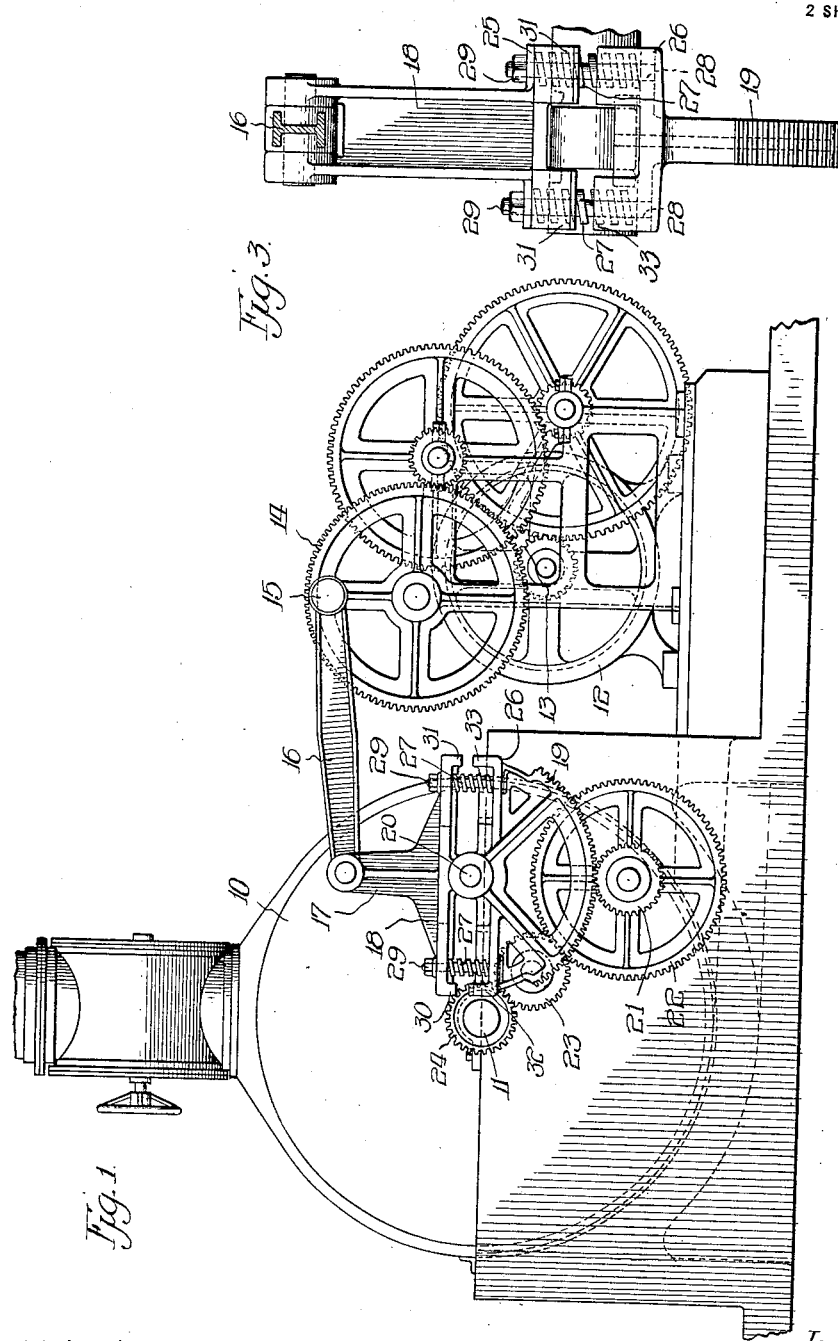

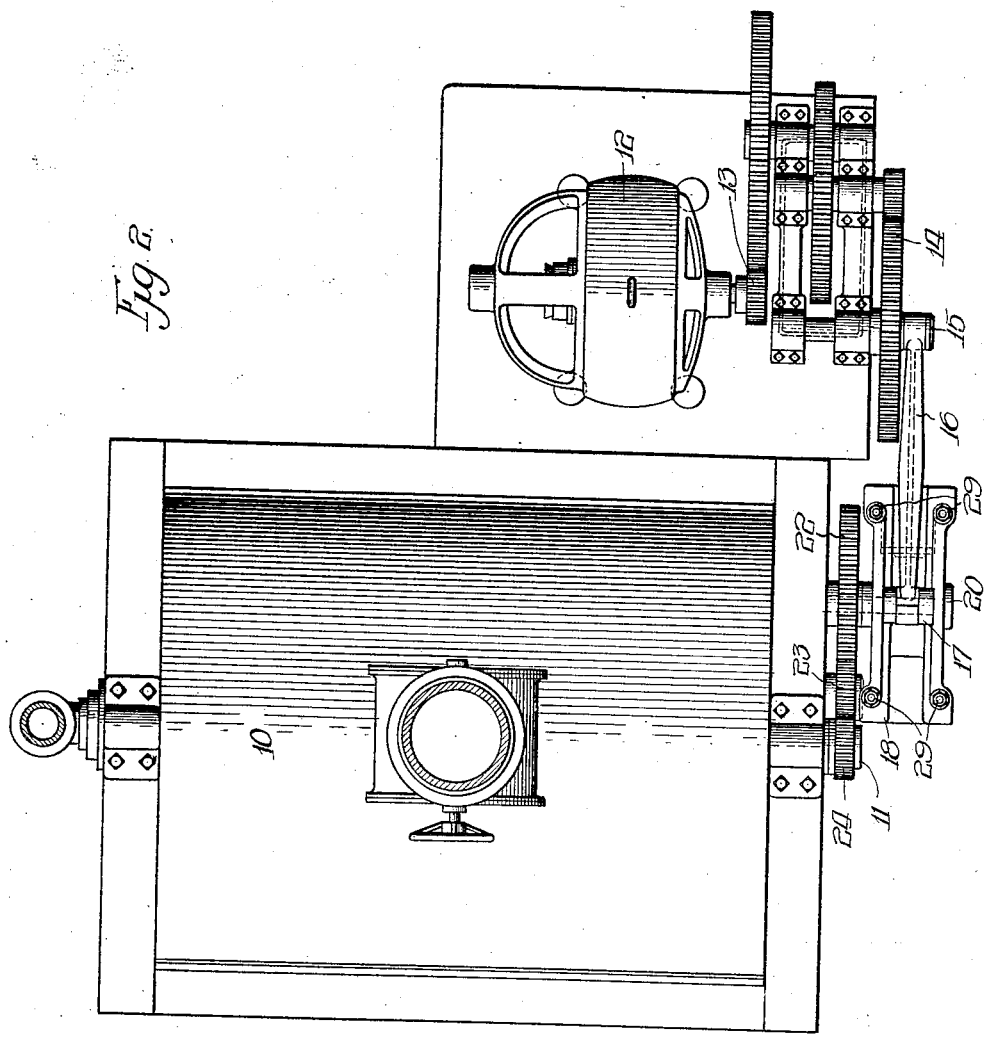

HANS C. HOTING, OF CHICAGO, ILLINOIS, ASSIGNOR TO TROY LAUNDRY MACHINERY COMPANY, LTD., OF CHICAGO, ILLINOIS, A CORPORATION OF NEW YORK.

DRIVING MECHANISM.

1,323,392. Specification of Letters Patent. Patented Dec. 2, 1919.

Application filed April 7, 1919. Serial No. 288,113.

*To all whom it may concern:*

Be it known that I, HANS C. HOTING, a citizen of the United States, residing at Chicago, in the county of Cook and State of Illinois, have invented certain new and useful Improvements in Driving Mechanism, of which the following is a specification.

This invention relates to driving mechanism, and more particularly to driving mechanism for reversible devices.

One object of this invention is to provide simple, durable, and efficient driving mechanism including oscillatory means whereby the inertia due to reversing action is gradually overcome, and which reacts to start the driven member in the opposite direction.

Another object is to provide transmission mechanism whereby the driven member may be reversed in a manner to meet the requirements for successful use.

These and other objects are accomplished by means of the arrangement disclosed on the accompanying sheets of drawings, in which—

Figure 1 is a side elevation of my improved driving and transmission mechanism operatively connected to a washing machine.

Fig. 2 is a plan view of the same arrangement; and

Fig. 3 is a detail end elevation of yieldably connected members forming a part of the driving and transmission mechanism.

I have shown my driving and transmission mechanism particularly in connection with a washing machine 10, having a rotary member represented by the shaft 11, which preferably is rotated, for example, three revolutions in one direction and then reversed and rotated three revolutions in another direction, whereupon the rotary member again is reversed. A motor 12 is here shown as the driving means, and is operatively connected with the shaft 11 of the rotary member of the washing machine through a train of gears including a pinion 13, mounted upon the motor shaft, which drives a plurality of reducing gears including a gear 14. Pivotally connected to the laterally-extending pin 15 on the gear 14 is a connecting arm 16 which also is pivotally connected to an arm 17 of a rocker member 18. This rocker member 18 is yieldably connected to a toothed sector 19, said rocker member 18 and toothed sector 19 being pivotally connected upon a common center pin 20. Meshing with the teeth of the sector 19 is a gear 21 having formed integrally therewith a gear 22 which meshes with an idler gear 23, which in turn meshes with a gear 24 mounted upon the rotor shaft 11. The gearing relationship from the toothed sector 19 to the gear member 24 is such that for a full swing of the sector 19, the rotor will be given three revolutions before being reversed. Interposed between laterally extending flange portions 25 and 26 of the rocker arm 18 and sector 19 are four springs 27, each of which surrounds a bolt 28, one end of each of which is threaded into the flange 26 and the other end of each of which is provided with a nut 29, whereby the relative tension of the springs may be regulated. The rocker arm 18 at its opposite ends is provided with downwardly extending projections 30 and 31, which under certain conditions respectively engage upwardly extending projections 32 and 33 on the sector 19 for changing the effective yieldable connection between the members 18 and 19 into a positive connection.

In the operation of the arrangement disclosed herein, let it be assumed that the motor is running in a direction to drive the toothed sector 19 in a counter-clockwise direction, whereupon the shaft 11 of the motor will be rotated in a clockwise direction. By the time that the projection 15 on the gear 14 has reached its dead center, so far as driving the rocker arm 18 is concerned, the sector will have moved into one extreme position wherein its left hand side meshes with the gear 21. As soon as the gear projection 15 reaches its dead center there will be a period of no driving action. However, at this time the inertia of the rotary parts, including those of the washing machine or driven member will tend to continue the counter-clockwise movement of the toothed sector 19, the result being that the right hand springs 27, as shown in Fig. 1, will be compressed for gradually overcoming the inertia of the moving parts. If said springs 27 in storing up energy do not completely overcome the inertia of the moving parts, the projections 31 and 33 will come into engagement with each other for forming a positive or rigid buffing connection between the members 18 and 19, whereupon the rotary parts will cease to rotate in the same direction. In the meantime, the gear projection 15 will have passed the dead center causing the toothed sector 19 to move in a clockwise direction, the springs 27 on the right hand side as shown in Fig. 1 gradually expanding for assisting in forcing the toothed sector in a clockwise direction for driving the shaft 11 of the rotary member in a counter-clockwise direction. The buffing action at the end of movement in the opposite direction will be the same as that described hereinabove.

By means of this mechanism the reversal in movement of members of relatively great inertia is made simple, and at the same time strains incident to reverse driving action are overcome in an approved manner.

It is my intention to cover modifications of my invention falling within the spirit and scope of the following claims.

I claim:

1. Driving mechanism for reversible devices including yieldably connected oscillatory members pivotally mounted upon a common center, one operatively connected to driving means and the other operatively connected to driven means, there being a buffing action between said members as a result of inertia of the driven member which reacts to start said driven member in the opposite direction.

2. Driving mechanism for reversible devices including a plurality of oscillatory members pivotally mounted upon a common center, and yieldable members interposed therebetween whereby upon a reversal of movement of the parts the inertia of moving parts will be absorbed by the yieldable members, the stored energy in the yieldable members assisting in moving the parts in the opposite direction.

3. Driving mechanism for reversible devices including a plurality of oscillatory members pivotally connected upon a common center, and springs interposed between said members for overcoming buffing actions upon reversal of the parts, said members having projections which may engage each other after the springs have been compressed a predetermined amount.

4. In combination, a washing machine having a rotary member, a source of driving power, a transmission connection therebetween whereby the direction of rotation of the rotary member may be reversed, said transmission connection including a plurality of oscillatory members having cooperating projections, and springs mounted between said members whereby buffing action incident to reversal of driving effort is absorbed by said springs, said projections coming into engagement with each other when said springs have been compressed a given amount.

Signed at Chicago, Illinois, this 1st day of April, 1919.

HANS C. HOTING.